United States Patent
Welch et al.

(10) Patent No.: US 6,863,959 B2
(45) Date of Patent: Mar. 8, 2005

(54) LAMINATE AND WEB CHARACTERISTIC CONTROL BY VARYING BONDING PATTERNS

(75) Inventors: Howard M. Welch, Woodstock, GA (US); Jay S. Shultz, Roswell, GA (US); Leslie D. Dobbins, Marietta, GA (US); James R. Fitts, Jr., Gainesville, GA (US); Charles J. Morell, Roswell, GA (US); Donald V. Willitts, Douglasville, GA (US); Michael T. Morman, Alpharetta, GA (US); Jason K. Wehner, Chicago, IL (US); Jessica M. Rawls, E. Flat Rock, NC (US); David M. Schertz, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/022,090

(22) Filed: Dec. 17, 2001

(65) Prior Publication Data

US 2002/0177376 A1 Nov. 28, 2002

Related U.S. Application Data

(60) Provisional application No. 60/257,827, filed on Dec. 22, 2000.

(51) Int. Cl.[7] .............................. B32B 27/14; B32B 3/00
(52) U.S. Cl. ........................ 428/195; 428/198; 442/149
(58) Field of Search ..................... 442/43, 58; 428/195, 428/198

(56) References Cited

U.S. PATENT DOCUMENTS

| | | | |
|---|---|---|---|
| 3,914,365 A | 10/1975 | Kim et al. ................. 264/147 |
| 4,020,208 A | 4/1977 | Mercer et al. .............. 428/255 |
| 4,059,713 A | 11/1977 | Mercer ....................... 428/36 |
| 4,140,826 A | 2/1979 | Liu ............................. 428/113 |
| 4,152,479 A | 5/1979 | Larsen ....................... 428/224 |
| 4,302,495 A | 11/1981 | Marra ........................ 428/110 |
| 4,348,444 A | 9/1982 | Craig ......................... 428/137 |
| 4,880,420 A | 11/1989 | Pomparelli ............... 604/385.1 |
| 5,032,442 A | 7/1991 | Yamazaki et al. .......... 428/105 |
| 5,316,836 A * | 5/1994 | Heindel et al. ............. 428/193 |
| 5,415,925 A * | 5/1995 | Austin et al. ............... 442/346 |
| 5,560,974 A * | 10/1996 | Langley ...................... 428/198 |
| 5,785,696 A | 7/1998 | Inoue et al. ................ 604/378 |
| 5,932,284 A | 8/1999 | Reynolds ................. 427/207.1 |
| 6,579,274 B1 | 6/2003 | Morman et al. ........ 604/385.22 |
| 6,627,564 B1 | 9/2003 | Morman et al. ............ 442/327 |
| 2002/0004350 A1 | 1/2002 | Morman et al. | |

FOREIGN PATENT DOCUMENTS

| | | | |
|---|---|---|---|
| DE | 19647458 | 5/1998 | ............ B32B/5/26 |
| EP | 0346928 | 12/1989 | ........... A61F/13/18 |
| EP | 0678607 | 10/1995 | .......... D04H/13/00 |
| EP | 0757127 | 2/1997 | ............ D04H/3/00 |
| EP | 1065046 | 1/2001 | ............ B32B/5/04 |
| EP | 1065047 | 1/2001 | ............ B32B/7/14 |
| EP | 1090617 | 4/2001 | ......... A61F/13/515 |
| GB | 2252047 | 7/1992 | ........... A61F/13/15 |
| JP | 9087954 | 3/1997 | ............ D04H/3/05 |
| JP | 2001009947 | 1/2001 | ............ B32B/5/02 |
| JP | 2001329460 | 11/2001 | ............ D04H/3/04 |
| WO | WO 97/22742 | 6/1997 | |
| WO | WO 00/08998 | 2/2000 | ........... A47L/13/16 |
| WO | WO 01/87213 | 11/2001 | ......... A61F/13/496 |
| WO | WO 01/87589 | 11/2001 | ............ B32B/5/00 |

* cited by examiner

Primary Examiner—Ula Ruddock
(74) Attorney, Agent, or Firm—Dority & Manning, P.A.

(57) ABSTRACT

New methods for and patterns of applying meltsprayed materials in single-layer web and laminate constructions so as to control various characteristics in the webs and laminates is provided. The patterns of adhesive produce scrim or cell-like patterns that allow for control of desirable characteristics. For example, the loft of a laminate may be enhanced, as well as strength properties.

16 Claims, 6 Drawing Sheets

LAMINATE AND WEB CHARACTERISTIC CONTROL BY VARYING BONDING PATTERNS

The present application claims the benefit of U.S. Provisional Application Ser. No. 60/257,827 filed Dec. 22, 2000, which is incorporated herein by reference thereto.

FIELD OF THE INVENTION

This invention relates to processes for creating desirable features in various laminates and webs by controlling the bonding patterns and physical characteristics of various adhesives, and products produced thereby. Such webs and laminates may be used in a variety of applications such as diapers, athletic bandages, wipers, or other products that require features such as elasticity, loft, or strength.

BACKGROUND OF THE INVENTION

Traditionally, nonwoven materials are formed by randomly spraying a molten material, such as a polyolefin, onto a moving web, such as a forming wire. Such processes produce desirably strong and soft materials at relatively low costs. Examples of such technologies include meltblowing, spunbonding, meltspinning, solution spinning, carding, meltspraying and wet/dry air laying. One particular example of such nonwoven materials that may be used in personal care products such as disposable diapers is formed by a spunbonding process. Meltblowing, on the other hand, may be used to create webs having fine pore structures for increased opacity and/or fluid barrier protection. Such technologies may be combined to form composite laminates such as spunbond/meltblown/spunbond ("SMS") materials. Such SMS materials have found particular uses as wipers, surgical gowns, and surgical dressings and an example of such material is described in U.S. Pat. No. 4,041,203 to Brock et al.

Various other types of laminates may be formed from nonwoven elastics and/or nonelastic materials. For example, composites of elastic and nonelastic nonwoven materials are commonly made by combining elastic and nonelastic webs in a lamination process to provide the entire composite with a degree of stetchability or elasticity. In addition, the loft, and thus the resulting softness, wicking ability, hooking ability, and absorbency, of various laminates may be controlled by varying the composition of webs from which the laminates are formed. These laminates and composites may then be used as the elastic and/or nonelastic components for various articles disposable personal care products such as, for example, diapers, pads, medical bandages, and the like.

Nonwoven materials that exhibit elastic properties may be produced by randomly spraying elastomeric polymers (instead of relatively non-elastic polyolefins) onto a moving web. Such nonwoven webs have little, if any, machine direction (MD) or cross-machine (CD) direction orientation. Examples of such elastomeric polymers include block copolymers such as polystyrene-polybutadiene-polystyrene (SBS) or polystyrene-polyisoprene-polystyrene (SIS), and Kraton® rubber. Although such randomly-oriented elastomeric polymer webs are highly effective in producing elastic nonwoven materials, their high cost generally makes them undesirable for many large-volume applications.

Typically, whether the laminate is elastic or nonelastic, an adhesive will be utilized to bond the various layers of the laminate together. The adhesive may, itself, be a separate functional layer or may, alternatively, be utilized merely to bond layers of the laminate together. For example, in an SMS laminate of the type mentioned above, the meltblown layer, which typically consists of very fine meltblown fibers, will act as both a functional barrier and as the adhesive to join the two outer spunbond facings together. On the other hand, extremely thin layers of meltblown may be used to bond two or more laminate layers together and the meltblown layers may serve no functional purpose other than to act as the "glue" to hold the laminate together as a cohesive product.

When forming elastic composite laminates, a nonelastic material (or at least a less elastic material) is usually bonded to an elastic material (or at least a more elastic material) while the elastic material or sheet is in a stretched condition. The bond between the elastic and the nonelastic material may be created by the use of an adhesive that may consist of meltsprayed thermoplastic fibers. When the tension on the more elastic material is released in the bonded laminate, the less elastic component of the combination is allowed to gather in the spaces between the bonding sites. The resulting composite elastic material is stretchable to the extent that the less elastic material gathered between the bond locations allows the more elastic sheet to elongate. Examples of these types of composite laminate articles and materials are set forth in U.S. Pat. Nos. 4,720,415 and 5,385,775, each of which is incorporated by reference herein.

In some stretchable laminate articles, elastic strands of continuous filaments are bonded to relatively inelastic sheet materials while the elastic strands are in a stretched condition. Such elastic continuous filaments may, in certain articles, be sandwiched between two or more relatively inelastic sheets. The relatively inelastic sheets may include nonwoven webs formed by meltblowing or spunbonding various polymers. Examples of such laminates are shown in U.S. Pat. No. 5,385,775 to Wright, which is incorporated herein in its entirety by reference thereto.

In the manufacture of such laminates, adhesives have been used to hold elastic strands or entire webs in place, thereby bonding the elastic strands or webs to nonwoven facing materials. U.S. Pat. No. 4,880,420 to Pomparelli discloses a method of applying adhesive to bond elastic strands to a fabric by using a sinusoidal-shaped line of adhesive. In Pomparelli, a relatively thick portion of adhesive is applied in a line along one or more elastic filaments in a direction generally parallel to the elastic filaments. However, the line of adhesive disclosed in Pomparelli does not intersect itself at any point. Instead, the sinusoidal adhesive line intersects a predetermined number of the same elastic strands several times as the line winds its way across the strands.

Another adhesive pattern is illustrated in U.S. Pat. No. 5,316,836 to Heindel et al., which is incorporated herein in its entirety by reference thereto. As shown in FIG. 7 of the '836 patent, a semi-cycloidal pattern of hot-melt adhesive may be formed on a substrate and then attached to another layer. The adhesive may be arrayed in a configuration wherein two or more adjacently located, semi-cycloidal patterns contact each other along adjacent marginal side sections 94 and 96. In other embodiments, the adjacent semi-cycloidal patterns may overlap by a discrete distance 93.

One problem in the manufacture of laminate articles is that using adhesives in random patterns often results in a laminate that does not exhibit characteristics of the laminate layers alone. For example, in diapers, excessive adhesive results in a stiff or inflexible diaper product that is undesirable to consumers. Also, if the adhesive is not applied in a preferred pattern, and is not efficiently utilized, it cannot reach optimum performance to provide the greatest bonding strength for each gram of adhesive applied to the article. Thus, a challenge in making products of this type is to find ways to use less adhesive, but still impart sufficient bonding strength to securely fix elastic filaments into a nonwoven or to securely fix laminate layers together.

In addition, the enhancement of various other material properties such as loft, tensile strength, modulus, porosity, tactile feel, and visual appearance is always a highly sought after goal. For example, loft or bulk in a nonwoven laminate provides key attributes for garments such as disposable diapers, feminine and adult care products, health care products such as disposable surgical gowns and the like. An increase in tensile strength provides tear resistance to various garments. Moreover, an increase in porosity will provide for more comfort to the wearer when garments constructed from highly porous materials are worn. It would be desirable to exercise more control over such properties in laminate materials. It is to these and other aims that the present invention is directed.

SUMMARY OF THE INVENTION

The present invention provides new methods for and patterns of applying meltsprayed materials in laminate constructions so as to control various characteristics in the laminates as well as new methods for forming elastic webs from non-elastic polyolefin resins. The articles in which the present invention may be utilized include various articles that require portions of elasticity, enhanced physical characteristics, etc. such as diapers, tampons, wipers, incontinence products, garments, gowns, feminine care products, health care products, and various laminate materials. Such articles will typically include one or more nonwoven layers bonded together with a meltspray material that is utilized as an adhesive. The meltspray material may, in addition to acting as an adhesive, also act as a functional layer.

The meltspray patterns that are applicable in the present invention are those that are formed from various overlapping strands of meltsprayed fibers. The degree of overlap, the particular patterns employed, the orientation characteristics of the fibers, and the particular fiber characteristics, such as fiber size and fiber weight, will create the desired characteristics in the inventive webs and laminates. In particular, by controlling the number of adhesive fiber streams per unit width, the frequency of the waves resulting from a meltsprayed fiber process, the orientation of the fibers, and the speed of lamination, various characteristics of the webs and the laminates can be altered.

In most of the bonding arrangements of the present invention, the adhesive material fibers are applied in lines that intersect in order to form a bonding network comprised of both adhesive-to-laminate layer bonds and adhesive-to-adhesive bonds.

In certain embodiments of the present invention, the bulk or softness of the laminate is controlled by providing for zones of enhanced loft in the bonded laminate. In particular, meltsprayed fibers can be formed into interlocking cell-type arrays. The use of wave-shaped oscillating fiber sprays produce polymer streams that interlock after being sprayed to form an open, cell-like netting structure in the adhesive layer that bonds adjacent laminate layers together. The controllability of the cell shape allows for specific, customized adhesive patterns to be made, thus resulting in the alteration of particularly chosen properties in the laminate structure.

In other embodiments, various physical characteristics of the polymers which form the open, cell-like, nettings can be varied so as to control laminate features. For example, the fiber sizes may be varied. Moreover, different types of materials may be utilized in the various polymer fibers that are utilized to form the nettings so that properties such as bondability, strength, heat latency, etc. can be altered or modified, depending on the particular end uses.

In some embodiments, the lay-down orientation of the fibers is controlled so that the materials will have a relatively high degree of MD or CD orientation. Such patterns are also produced by overlapping oscillating fibers while they are still in their molten state, thus forming a pseudo-knit structure.

In another aspect of the invention, a process of manufacturing an absorbent laminated article is utilized. The process comprises providing a nonwoven layer and spraying an adhesive upon the surface of the nonwoven layer, wherein the adhesive is applied to the nonwoven layer in a predetermined, non-random pattern that is capable of providing certain characteristics to the laminate structure.

Other objects, advantages and applications of the present invention will be made clear by the following detailed description of embodiments of the invention and the accompanying drawings wherein reference numerals refer to like or equivalent structures.

DEFINITIONS

Figure 1:
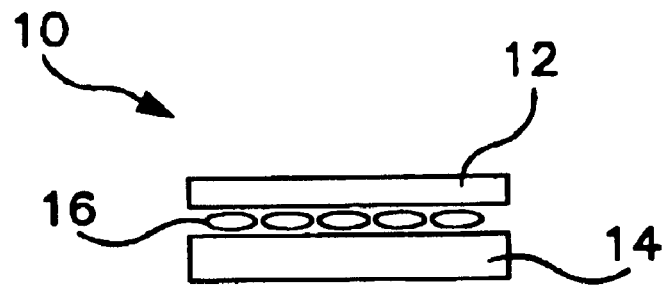
FIG. 1 is a cross-sectional side view of an exemplary laminate having an example of the inventive adhesive scrim bonding two facings together.

The term "continuous filaments", as used herein, refers to strands of continuously formed polymeric filaments. Such filaments will typically be formed by extruding molten material through a die head having a certain type and arrangement of capillary holes therein.

The term "elastic" or "elasticized", as used herein, refers to a material which, upon application of a biasing force, is stretchable, which is elongatable to at least about 60 percent (i.e., to a stretched, biased length which is at least about 160 percent of its relaxed unbiased length), and which will recover at least 55 percent of its elongation upon release of the stretching force. A hypothetical example of an elastic material would be a one (1) inch sample of a material which is elongatable to at least 1.60 inches and which, when released, will recover to a length of not more than 1.27 inches. Many elastic materials may be elongated by more than 60 percent (i.e., more than 160 percent of their relaxed length). For example, some elastic material may be elongated 100 percent or more, and many of these will recover to substantially their initial relaxed length such as, for example, within 105 percent of their original relaxed length upon release of the stretching force.

As used herein, the term "polymer" generally includes, but is not limited to, homopolymers, copolymers, such as, for example, block, graft, random and alternating copolymers, terpolymers, etc. and blends and modifications thereof. Furthermore, the term "polymer" includes all possible geometrical configurations of the material, such as isotactic, syndiotactic and random symmetries.

The term "composite nonwoven fabric", "composite nonwoven", "laminate", or "nonwoven laminate", as used herein, unless otherwise defined, refers to a material having at least one layer of sheet material joined to at least one other layer of sheet material. Such composites may have, but are not required to have, a gatherable layer which is bonded to an elastic layer or material so that the gatherable layer may be gathered between bonding locations. This type of composite elastic laminate is disclosed, for example, in U.S. Pat. No. 4,720,415 to Vander Wielen et al., which is incorporated herein in its entirety by reference thereto. In nonelastic laminates, the layers of sheet material will not necessarily be gatherable and may not be elastic at all.

As used herein, the term "nonwoven web" refers to a web having a structure of individual fibers or threads that are interlaid, but not in an identifiable, repeating manner. Nonwoven webs have been, in the past, formed by a variety of processes such as, for example, meltblowing processes, spunbonding processes and bonded carded web processes.

As used herein, the term "meltblown fibers" means fibers formed by extruding a molten thermoplastic material through a plurality of fine, usually circular, die capillaries as molten thermoplastic material or filaments into a high velocity gas (e.g., air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, which is incorporated herein in its entirety by reference thereto.

As used herein, the term "spunbonded fibers" refers to small diameter fibers formed by extruding a molten thermoplastic material as filaments from a plurality of fine, usually circular, capillaries of a spinerette with the diameter of the extruded filaments then being rapidly reduced as by, for example, eductive stretching or other well-known spunbonding mechanisms. The production of spun-bonded nonwoven webs is illustrated in patents such as, for example, U.S. Pat. No. 4,340,563 to Appel et al., and U.S. Pat. No. 3,692,618 to Dorschner et al. The disclosures of these patents are incorporated herein in their entireties by reference thereto.

As used herein, "scrim" refers generally to a fabric or nonwoven web of material which may be elastic or inelastic, and having fibers lying in a machine direction ("MD") oriented along the path of manufacture and fibers oriented and lying in a cross-machine direction ("CD"). Heretofore, elastic scrims made from meltblown processes inherently create a MD-oriented material.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

The present invention provides new methods for and patterns of applying meltsprayed materials in web and laminate constructions so as to control various characteristics in the laminates. The articles in which the present invention may be utilized include various articles that require portions of elasticity, enhanced physical characteristics, etc. such as diapers, tampons, wipers, and various laminate materials. Such articles will typically include one or more nonwoven layers bonded together with a meltspray material that is utilized as an adhesive. The meltspray material may, in addition to acting as an adhesive, also act as a functional layer. In one such embodiment, the meltspray material is a relatively highly oriented nonwoven material wherein the meltsprayed fibers have been oriented primarily either in the MD and/or in the CD direction so that the resulting web is relatively elastic.

In the present invention, various meltsprayed adhesive patterns may be formed by overlapping strands of adhesive meltsprayed fibers. The degree of overlap, the particular patterns employed, and the particular fiber characteristics, such as fiber size and fiber weight, will be employed to create the characteristics desired in the inventive nonwoven webs and laminate products. By controlling the number of adhesive fiber streams per unit width, the frequency of the waves resulting from a meltsprayed fiber process, the width of the waves, the ratio of the frequency to the width of the waves, the overall orientation of the fibers, and the speed of lamination, various characteristics of the laminate can be altered.

In particular, the present invention may be utilized in order to allow orientation of the meltsprayed fibers in either the MD, CD, or equally in the MD and CD. This aspect is different than in current meltblown processes for making elastic scrims where MD-oriented material is inherently created.

In FIG. 1, an exemplary laminate 10 employing the inventive bonding pattern is shown. In the exemplary construction of laminate 10, two outer facings 12 and 14, which for example may both be spunbond materials, are bonded together by an elastic scrim 16. Although two facings are shown bonded together by the inventive bonding adhesive pattern, it is to be understood that a scrim material may be utilized in conjunction with only one laminate layer so that one facing forms a laminate in conjunction with the inventive adhesive scrim.

Figure 2:
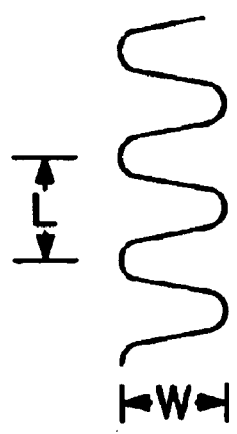
FIG. 2 illustrates the frequency/width relationship of an adhesive bonding fibers of the present invention.

FIG. 2 shows a single adhesive fiber strand and illustrates various characteristics that may be varied in order to obtain the desired traits in the scrim patterns utilized in the present invention. As shown in FIG. 2, the length "L" between peaks of the fiber strand may be considered the frequency of the oscillating wave of the fiber strand. The width "W" from the bottom of a peak to the top of the peak is also illustrated. In order to obtain optimum performance of the adhesive bonding pattern, the bonding fibers may have their frequencies (or lengths "L") varied, their widths "W" varied, or the ratio of L to W (L/W) varied.

Figure 3:
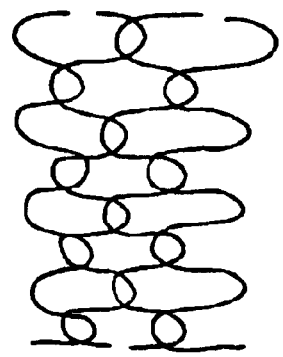
FIG. 3 represents an exemplary bonding pattern of the present invention.
Figure 3A:
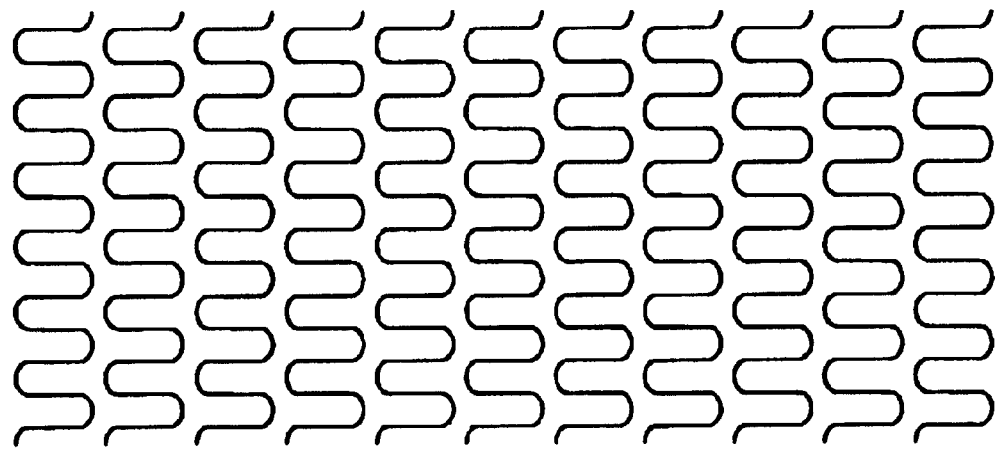
FIG. 3A shows a prior art bonding pattern that employs adhesive fibers that do not intersect in any kind of cell arrangement.
Figure 4:
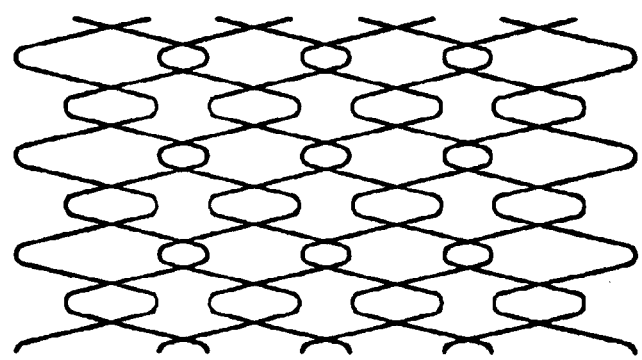
FIG. 4 illustrates another adhesive bonding or scrim pattern similar to that of FIG. 3.

FIGS. 3 and 4 illustrate exemplary scrims having multiple overlapping adhesive fibers. As shown particularly in FIG. 3, four strands of fibers interlock to produce the scrim (fibers A, B, C, and D). The oscillating pattern of adhesive fibers are shown interlocked. By controlling the frequency, width, and proximity of the scrim's fibers, scrims can be produced that either have a additional strength in the MD direction, the CD, or equally in both directions.

Figure 3B:
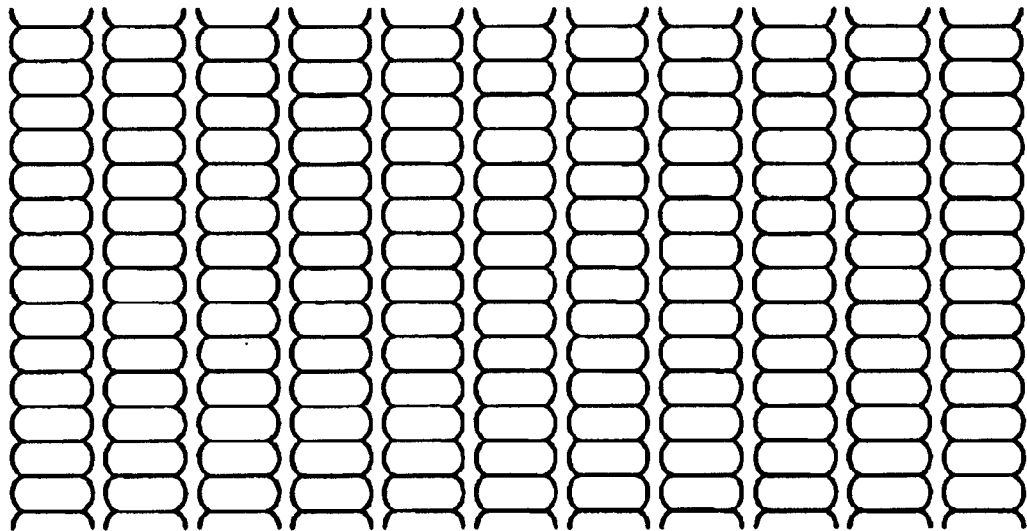
FIG. 3B shows another exemplary adhesive bonding spray or scrim pattern.
Figure 3C:
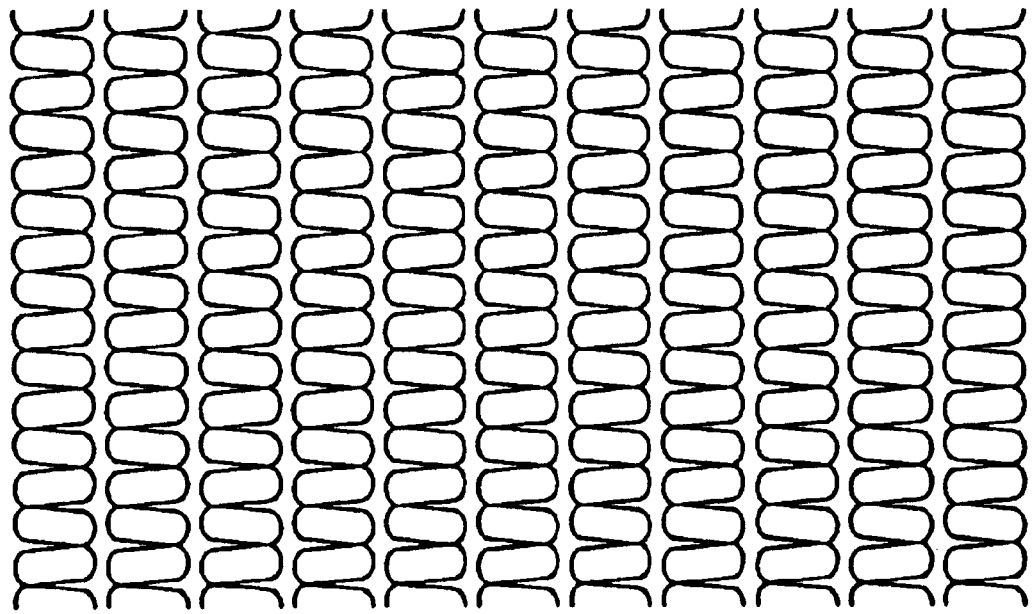
FIG. 3C shows another exemplary adhesive bonding spray or scrim pattern.
Figure 5A:
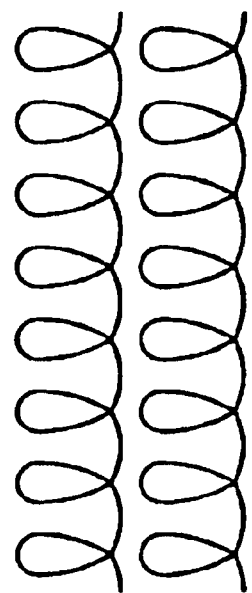
FIG. 5A illustrates a swirled type of adhesive bonding pattern.
Figure 5B:
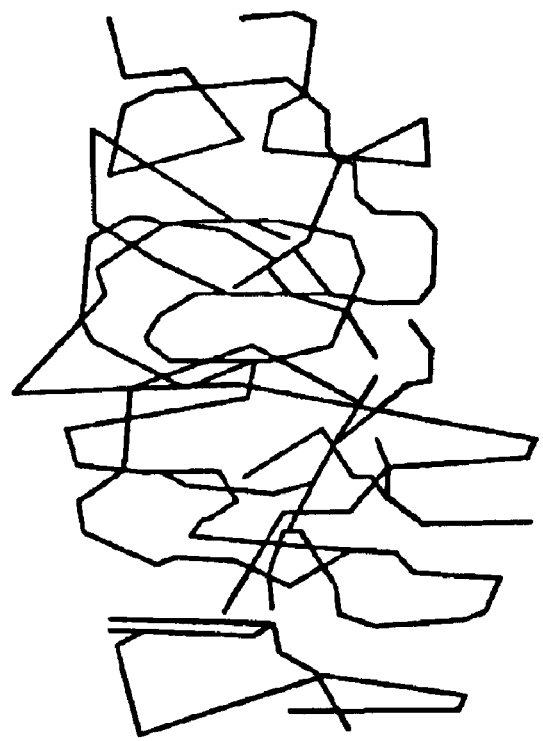
FIG. 5B shows a randomized adhesive bonding pattern having a majority of adhesive lines in the CD direction.

Other exemplary bonding patterns are illustrated in FIGS. 3B, 3C, and 5A. Such patterns all share the similar feature of overlapping fibers—either upon themselves (as shown in FIG. 5A) or upon one or more of the other adhesive fiber strands (as shown in FIGS. 3 and 4).

One particular means of applying adhesives in the laminates utilizes meltblown spray technology. In this technology, meltblowing equipment has typically presented the adhesive to the facings in the laminates in a random fibrous configuration. Multiple adhesive-to-facing and bonds per unit length of facing are formed, along with multiple facing to facing adhesive bonds per unit area. In general, strong, flexible adhesive bonds are required to maintain the flexibility and integrity of the laminate in use. If the adhesive-to-facing bonds are too few in number or are too weak, then the tension properties of the laminate will be compromised.

The common remedy in prior art processes for remedying this condition was to increase the number of bonding sites by either increasing the meltspray air pressure, or by slowing the lamination speed. As the meltspray air pressure is increased, the resulting adhesive fiber size is reduced in these known processes, creating weaker bonds. Increasing the amount of adhesive used per unit area to create larger adhesive filaments usually repairs this, but this usually increases the cost of the laminate. Lowering the lamination speed decreases machine productivity, but negatively impacts product cost.

Typically, when laminates are formed, one or more facings of sheet material are brought together after one or both of the facings have been sprayed or coated with an adhesive. Then, the facings, having the adhesive mounted to at least one of the facings (or in some embodiments, both of the facings) are brought together adjacent one another with pressure being applied to join the laminated facings together in a cohesive product. However, the present invention is not limited to any particular process of forming the laminates, provided the inventive adhesive bonding patterns are employed in the laminates.

The lamination process employed in the present invention may operate at high speeds. In fact meltspray processes running at 1500 feet per minute ("fpm") or more may be utilized.

The adhesives are applied according to the present invention in a continuous, wave-shaped pattern so that individual fibers adhesive strands intersect each other in a predominantly perpendicular fashion. The bonding of the continuous adhesive filaments to each other to form the inventive nettings, or scrim, is also controlled to a known number per unit length so that predictable and controllable laminate properties are achieved. The adhesives may be applied with known meltspray technology, or with modified versions thereof that allows individual or groups of individual meltspray adhesive fiber strands to be oscillated so as to form the inventive interlocking wave patterns. The adhesive employed to bond the sheet(s) will be applied to one or more of the laminate sheet layers by using a stationary spray head capable of forming the predetermined pattern or by using moving, or oscillating, nozzle(s) that are designed to follow the predetermined pattern path required for the adhesive line. Various equipment for applying the adhesive lines of the present invention may be utilized and the invention is not limited to any particular apparatus. Such technology is within the purview of those having ordinary skill in the present art and the description of such equipment and meltspray adhesive-forming processes are unnecessary.

Various types of adhesives may be employed in the present invention, including those having elastomeric properties such as styrene block co-polymer based adhesives that are available from the ATO-Findley Adhesives Company. Another class of polymers that may be utilized in the present process as the meltspray adhesive when an elastic scrim is needed, are tackified blends of Kraton® elastomeric polymers distributed by Shell Chemical Company. Various Kraton polymers may be utilized, including, but not limited to, the Kraton G Series of polymers. Other exemplary elastomeric materials that may be used include tackified polyurethane elastomeric materials such as those available under the trademark ESTANE from B.F. Goodrich & Co., polyamide elastomeric materials such as those available under the trademark PEBAX from the Rilsan Company, and polyester elastomeric materials such as those available under trade designation HYTREL from E. I. DuPont De Nemours & Company.

However, the present invention is not limited to this or any particular polymer or material from which to form the meltspray adhesive. For example, various materials, including the following, may be used: polypropylene, polyethylene, polyesters, polyethylene terephthalate, polybutane, polymethyidentene, ethylenepropylene copolymers, polyamides, tetrablock polymers, styrenic block copolymers, polyhexamethylene adipamide, poly-(oc-caproamide), polyhexamethylenesebacamide, polyvinyls, polystyrene, polyurethanes, thermoplastic polymers, polytrifluorochloroethylene, ethylene vinyl acetate polymers, polyetheresters, polyurethane, polyurethane elastomerics, polyamide elastomerics, polyamides, and various viscoelastic hot melt pressure sensitive adhesives. In addition, such materials may be utilized to meltspray single-constituent, bi-constituent, and bi-component adhesive fibers within the scope of the presently described invention.

The materials that are utilized to form the melt-spray adhesive may have sufficient tackiness to enhance the bonding strength of the laminate by allowing a degree of autogenous bonding. For example, the polymer itself may be tacky when formed into fibers and/or filaments or, alternatively, a compatible tackifying resin may be added to the sprayable compositions described above to provide tackified adhesive fibers that autogenously bond. Various known tackifying resins and tackified compositions may be employed, such as those described in U.S. Pat. No. 4,787, 699, which is incorporated herein in its entirety by reference thereto.

Any tackifier resin can be used that is compatible with the adhesive polymer and can withstand the meltspraying process conditions. Generally, hydrogenated hydrocarbon resins exhibit enhanced temperature stability and, thus, may be desirable tackifiers. REGALREZ™ hydrocarbon and ARKON™ series tackifiers are examples of hydrogenated hydrocarbon resins. ZONATAK™ 501 lite is an example of a terpene hydrocarbon. REGALREZ™ hydrocarbon resins are available from Hercules Incorporated. ARKON™ series resins are available from Arakawa Chemical (U.S.A.) Incorporated. Of course, the present invention is not limited to use of such tackifying resins, and other tackifying resins that are compatible with the other components of the composition and that can withstand the processing conditions may also be used.

By changing the compositions of one or more of the individual adhesive fiber strands utilized to form the presently-described cell-like arrays, a multitude of material properties can be controlled.

The sheet materials that may be utilized as the various laminate layers of the present invention include nonwoven webs such as meltblown webs, spunbond webs, or carded webs, woven webs, or a film material. In one particular embodiment, polypropylene spunbond facings having a basis weight of approximately 0.4 ounces per square yard ("osy") may be employed.

The materials utilized to form the meltspray adhesive fibers may also be utilized in forming the outer facings of the presently described laminate. In particular, various webs may be utilized that are formed from elastomeric or non-elastomeric fibers. Various polyester elastic materials are, for example, disclosed in U.S. Pat. No. 4,741,949 to Morman et al., which is incorporated herein in its entirety by reference thereto. Other useful elastomeric polymers also include, for example, elastic copolymers of ethylene and at least one vinyl monomer such as, for example, vinyl acetates, unsaturated aliphatic monocarboxylic acids, and esters of such monocarboxylic acids. The elastic copolymers and formation of elastomeric fibers from these elastic copolymers are disclosed in, for example, U.S. Pat. No. 4,803,117, which is also incorporated herein in its entirety by reference thereto.

The facing(s) of the present invention may be a mixture of elastic and nonelastic fibers or particulates. For example, U.S. Pat. No. 4,209,563 is incorporated herein in its entirety by reference thereto and describes the process by which elastomeric and nonelastomeric fibers are commingled to form a single coherent web of randomly dispersed fibers. Another example of such an elastic composite web is shown in U.S. Pat. No. 4,741,949, which is also incorporated herein in its entirety by reference thereto wherein an elastic nonwoven material is described as including a mixture of meltblown thermoplastic fibers and other materials. The fibers and other materials may be combined in the forming gas stream in which the fibers are borne so that an intimate entangled commingling of fibers and other materials, e.g., wood pulp, staple fibers or particulates such as, for example, activated charcoal, clays, starches, or hydrocolloid (hydrogel) particulates, occurs prior to collection of the fibers upon a collecting device to form a coherent web of randomly dispersed fibers.

Various processing aids may also be added to the polymers utilized in the present invention (either in the facings or in the meltspray adhesives). Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized.

In general, the adhesive bonds in the present laminate are regulated per unit area by the application system such that key properties such as stretch and elongation can be controlled to precisely match product performance needs. This invention allows for the optimization of the adhesive and facings in the laminate, thus providing a preferred match of laminate properties and laminate cost. Laminate properties that can be more precisely adjusted with this invention include the softness or drapability of the material—a minimal amount of adhesive can be utilized to provide a less rigid structure. Further, the laminate tension characteristics can be better tailored to product requirements using this invention because the adhesive bonds can be prescribed and/or predetermined within the laminate. Thus, a minimal number of the adhesive bonds can be used in certain embodiments to allow more flexibility in the laminate. Laminate elongation and retraction properties also may be designed to meet product needs by controlling the number of adhesive bonding sites. The amount of laminate bulk, as described below, may be also be modulated since the retraction and resulting buckling of the facings can be controlled due in part to the ability to regulate the number of adhesive bond sites and the size and number of cell openings in the adhesive scrim.

The overall basis weight of the laminate can vary, but in many applications is between about 2 and 4 osy. In one particular embodiment, the basis weight is between about 2.85 and about 3.2 osy.

In certain embodiments of the present invention, the bulk or softness of the laminate is controlled by providing for zones of enhanced loft in the bonded laminate. The enhanced loft is created where the laminated layers do not come into contact with the adhesive material. Such processes may provide zones of controlled loft in both film/nonwoven and nonwoven/woven laminates as well as various laminates employing woven sheet materials.

By proper choice of the substrates and the laminate stretch conditions, controlled loft may be further enhanced to allow for additional softness, visual distinctiveness, Velcro hook attachment areas, absorbency, and dryness. Controlled loft is particular valuable in laminated products such as diapers where softness and bulk are valuable.

In particular, in this embodiment, the cell shapes of the netting material can be designed to be essentially symmetrical in shape, or can be elongated in either the CD or MD direction by controlling the process setup and run conditions. In this manner, the controllability of cell shape allows for specific, customized adhesive patterns to be made.

In other embodiments, various physical characteristics of the polymers which form the open, cell-like, nettings can be varied so as to control laminate features. For example, the fiber sizes may be varied. Moreover, different types of materials may be utilized in the various polymer fibers that are utilized to form the nettings so that properties such as bondability, strength, heat latency, etc. can be altered or modified, depending on the particular end uses. Moreover, the particular compositions from which individual fibers may be varied as described above.

When an elastic web is desired as part of the laminate material, such elastic webs may be produced according to the teachings of the present invention. Although more expensive elastic materials, such as the elastomeric compositions described above, may be utilized to provide the elasticity, when lower cost alternatives are needed the fiber pattern orientation techniques of the present invention may be utilized instead.

Figure 6A:
FIG. 6A is a photomicrograph showing the random orientation of fibers in an exemplary prior art spunbond material.
Figure 6B:
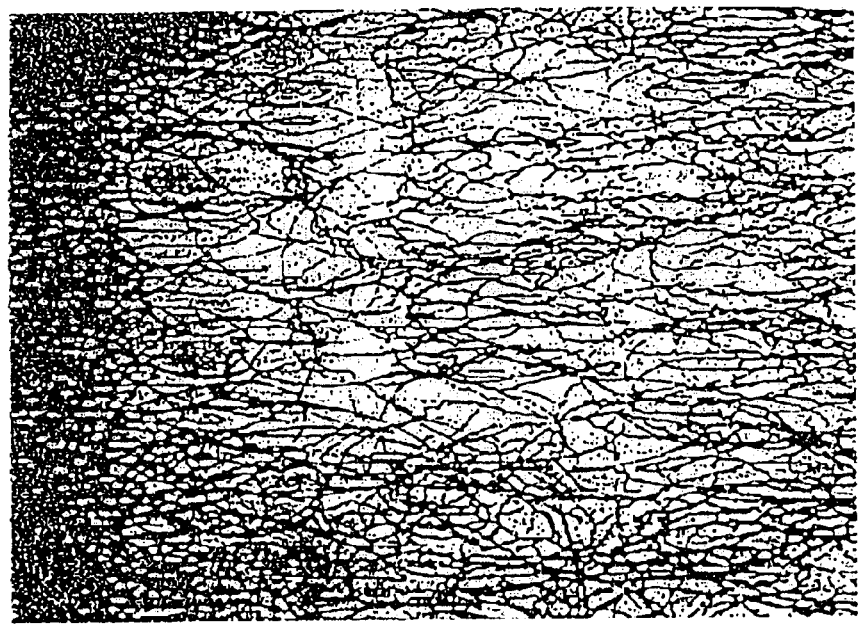
FIG. 6B is a photomicrograph showing the CD orientation of fibers in an highly oriented, elastic, nonwoven material of the present invention.

An elastic nonwoven web may be produced from suitable non-elastic polyolefin materials such as polyethylene and polypropylene by arranging the meltsprayed fibers in an orientation that is either primarily in the MD and/or CD direction. An example of such lay-down pattern is shown in FIG. 6B. As contrasted to the fiber orientation shown in the prior art spunbond web of FIG. 6A, the primarily CD-oriented fibers provide elasticity without the need for elastomeric compositions. The elastic web of FIG. 6B has a pseudo-knit macro-structure, and exhibits an approximate 33% elongation with little evidence of stress relaxation. By manipulating the structure of the nonwoven web, a low-cost, elastic, fiber web is produced.

EXAMPLES

The following examples describe various embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

Example 1

Two spunbond facings made from polypropylene and then "necked" so as to be wider at the ends and narrower thorough a middle portion. A Findley-brand elastic material designated as KX-2695-01 was meltsprayed through an ITW-brand meltspray head. The particular ITW-brand head had eight 1"-wide nozzles arranged so as to have a hole density per nozzle of 10 per inch. The elastic adhesive was sprayed onto one of the necked spunbond facings which was then pressed to the other necked spunbond facing in a smooth steel roll on rubber nip in order to produce the cohesive laminate.

The adhesive bonding pattern utilized was a netting construction with a high degree of CD orientation.

A total of eight laminates were made according to this process. The resulting laminates were elastic in the cross-machine direction only since the necked spunbond facings were extensible in the CD direction.

Example 2

An SMS laminate having a controlled loft was created as follows. The laminate was bonded utilizing a meltsprayed material created by an 8"-wide ITW-brand adhesive spray head. The ITW head had 8 nozzles, with each nozzle having 5 adhesive capillaries per inch. The bonding scrim produced by this equipment was a CD oriented netting type pattern.

The adhesive utilized was a Rextac 2730 resin available from Huntsman Polymers Corporation of Odessa, Tex., and having a basis weight of 5 grams per square meter ("gsm"). The outer spunbond facings were a 0.5 ounces per square yard ("osy") basis weight polypropylene material. Meltblown layers utilized in the present examples were meltblown layers having basis weights of 0.3 osy and 0.5 osy, respectively. The laminate was formed at a rate of 300 feet per minute ("fpm").

The resulting laminates exhibited a regular, controlled, patterned loft as set by the adhesive scrim pattern utilized.

Example 3

A highly structured (versus randomly-placed fiber) nonwoven web was produced as follows. A polypropylene resin (PF-015, available from Montel, Inc.) was applied to a moving web of release paper with a band of overlapping Omega oscillating spray nozzles. The nonwoven web produced a nonwoven having a high degree of CD orientation like the material shown in FIG. 6B.

Example 4

Another highly structured nonwoven web was produced as follows. A 3:1 polymer blend (by weight) of polypropylene (PF-015, available from Montel, Inc.) and E-33 amorphous poly-alpha olefin (APAO) (available from Huntsman Chemical Co.) was applied to a moving web via a modified Omega meltspray head. The APAO softened the resulting polypropylene material in order make it less brittle and lower the melt viscosity, but allowed the resulting nonwoven to retain sufficient strength for end uses. The modifications to the Omega spray head included an additional row of oscillating nozzles that were off-set to the adjacent row, thus resulting in more uniform coverage of the polymer. The resulting nonwoven material was an elastic web having an approximate 33% elongation, with little evidence of stress relaxation.

It is to be understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A nonwoven material comprising:
   individual polymer fibers arranged in a predefined pattern wherein adjacently-located individual fibers overlap to form an organized structure and wherein said predefined pattern has the majority of said individual fibers lying in either a relatively machine-direction orientation, a relatively cross-machine direction orientation, or relatively both a machine-direction and cross-machine direction orientation so as to form an organized structure of polymer fibers, wherein each of said individual polymer fibers does not overlap itself and contacts no more than one other adjacently-located individual polymer fiber.

2. The nonwoven material of claim 1 wherein said polymer fibers comprise elastomeric fibers.

3. The nonwoven material of claim 1 wherein said polymer fibers comprise non-elastomeric fibers.

4. The nonwoven material of claim 1 wherein said material is an adhesive layer capable of joining two or more layers of material together in a laminate construction.

5. The nonwoven material of claim 1 wherein a majority of individual fibers are oriented in relatively both the machine-direction and in the cross-machine direction.

6. The nonwoven material of claim 1 wherein said polymer fibers comprise polyolefins.

7. A laminate containing the nonwoven material defined in claim 1.

8. A laminate as defined in claim 7 wherein the laminate includes at least two facings adhered together by an adhesive layer, the adhesive layer comprising the nonwoven material.

9. A laminate comprising:

at least two facings adhered together by an adhesive layer;

said adhesive layer comprising individual polymer fibers arranged in a predefined pattern wherein adjacently-located individual fibers overlap to form an organized structure, said individual polymer fibers containing a tackifier, and wherein said predefined pattern has the majority of said individual fibers lying in either a relatively machine-direction orientation, a relatively cross-machine direction orientation, or relatively both a machine-direction and cross-machine direction orientation so as to form an organized structure of polymer fibers, wherein each of said individual polymer fibers does not overlap itself and contacts no more than four other adjacently-located polymer fibers.

10. The laminate of claim 9 wherein said polymer fibers comprise elastomeric fibers.

11. The laminate of claim 9 wherein said polymer fibers comprise non-elastomeric fibers.

12. The laminate of claim 9 wherein each of said individual polymer fibers contacts no more than two other adjacently-located individual polymer fibers.

13. A nonwoven material comprising:

individual polymer fibers arranged in a predefined pattern wherein at least two of said fibers are joined to create an overlapping bonded structure, wherein each of said individual polymer fibers does not overlap itself and contacts no more than one other adjacently-located individual polymer fiber.

14. The nonwoven material of claim 13 wherein said fibers are joined thermally.

15. The nonwoven material of claim 13 wherein said fibers are continuous filaments.

16. A nonwoven material comprising:

individual polymer fibers arranged in a predefined pattern wherein adjacently-located individual fibers overlap to form an organized structure and wherein each of said individual fibers in said predefined pattern has concurrently a machine-direction orientation component and a cross-machine direction orientation component so as to form an organized structure of polymer fibers, the polymer fibers comprising a tackified composition, and wherein each of said individual polymer fibers does not overlap itself.

* * * * *